Nov. 5, 1957  J. W. KELLEY  2,812,195
VEHICLE HITCH HAVING A LOCKING STEM AND AUTOMATICALLY
OPERATING STEM-ENGAGING AND DISENGAGING MEANS
Filed Sept. 30, 1955
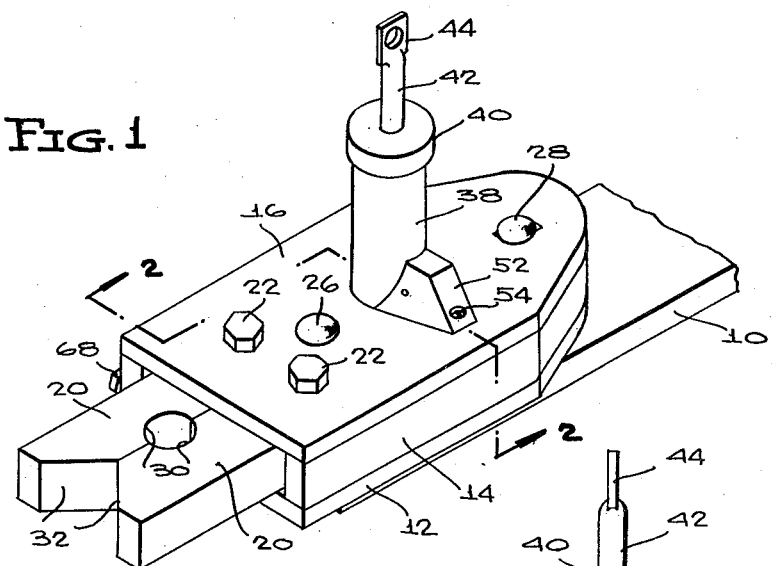
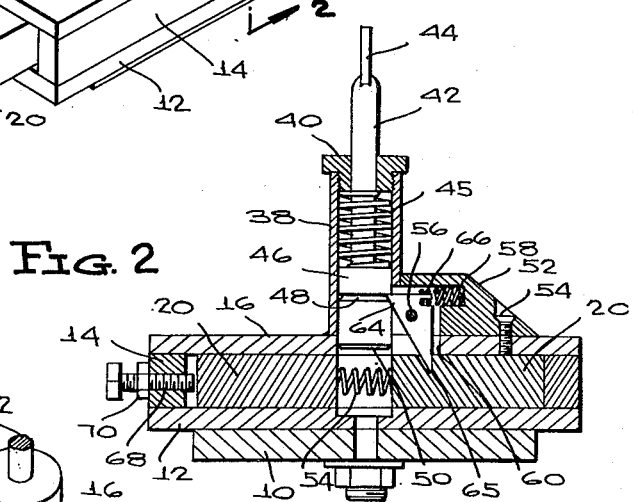
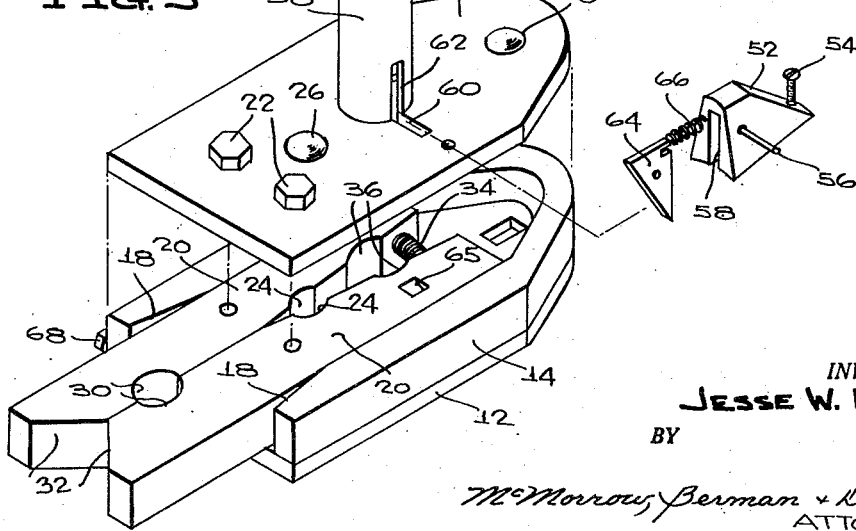
INVENTOR.
JESSE W. KELLEY
BY
McMorrow, Berman & Davidson
ATTORNEYS

2,812,195

VEHICLE HITCH HAVING A LOCKING STEM AND AUTOMATICALLY OPERATING STEM-ENGAGING AND DISENGAGING MEANS

Jesse W. Kelley, Washingtonville, Pa.

Application September 30, 1955, Serial No. 537,721

4 Claims. (Cl. 280—510)

This invention, a tractor hitch, includes pivoted jaws lockable in one position, by a locking stem extending therebetween, about a connecting pin carried by a cooperating hitch device of a drawn vehicle, and having means normally holding the stem against downward movement when the pin is not yet engaged between the jaws.

The present application is a continuation-in-part of my copending application Serial No. 449,625 filed August 13, 1954, and has as its main object the addition of the plunger-restraining means. It was found that the hitch of said application, while functioning efficiently for its intended purpose, required that the locking stem be manually restrained from dropping, during the operation of the traction vehicle to properly position the hitch for spreading of the jaws by the connecting pin carried by the hitch means of the drawn vehicle. A rope or cable has been used extending from the stem and held by the operator, but this has left only one hand free for operating the machinery.

The object of the present invention, accordingly, is to hold the stem up under the circumstances mentioned, by a novel catch or trigger mechanism operated to a stem-releasing position responsive to spreading of the jaws by the entering connecting pin, thus providing fully automatic operation.

Other objects will appear from the following description, the claims appended thereto, and from the annexed drawing, in which like reference characters designate like parts throughout the several views, and wherein:

Figure 1 is a perspective view of the hitch equipped with the catch mechanism according to the present invention;

Figure 2 is a transverse section on line 2—2 of Figure 1; and

Figure 3 is an exploded perspective view of the hitch.

Overlying a traction vehicle draw bar 10 is a wide, flat base plate 12 tapering at its front end. A wall 14, closed at its sides and front but formed open at its back, spaces from the base plate a cover plate 16. To permit spreading of the rear end portions of the jaws, the inner surfaces of the wall are beveled at 18 at the open rear end of the hitch.

Within the rearwardly opening housing defined by the plates 12 and 16 and wall 14, a pair of side by side, flat jaws 20 are pivoted intermediate their ends to swing about parallel pins 22 in a common plane. Forwardly of the pins 22, opposed recesses 24 in the confronting inner faces of the pins receive a connecting bolt 26 extending between the base and cover plates, sufficiently loosely to insure free pivotal movement of the jaws about their axes. Another connecting bolt 28 between the base and cover plates is provided forwardly of the jaws.

Rearwardly of the pivot axes, the jaws have confronting recesses 30 defining an opening for a connecting pin, not shown, carried by the hitch mechanism of a drawn vehicle, also not shown. When the tractor is backed up, the connecting pin is guided between the jaws by forwardly converging guide faces 32 of the jaws, and spreads the rear ends of the jaws against the restraint of a compression spring 34 interposed between the front ends of the jaws. When the connecting pin moves into the recesses 30 the spring is free to expand and closes the jaws, at the rear ends thereof, about the pin. With the front ends of the jaws now spread by the spring, a lock stem to be described in detail hereinafter, is free to drop into position between opposed recesses 36 of the jaws to lock the jaws against pivotal movement, thereby to in turn lock the connecting pin between the jaws.

Rigid with and projecting upwardly from cover plate 16 is a lock stem housing 38 having a cap 40 centrally apertured to receive a vertically slidable stem 42 the upper, projecting end of which has a flattened, apertured enlargement 44 to which a cable, not shown, may be attached. A compression spring 45 is interposed between cap 40 and a cylindrical head 46 of the stem. The head has a circumferential groove 48 formed with a top surface lying in a plane normal to the length of the stem, and also has a chamfered lower end 50.

With the exception of the groove 48, all this is substantially as shown in my co-pending application. In accordance with the invention, a catch housing 52 is fixedly connected to cover plate 16 by a screw 54. A pivot pin 56 extends across a cavity 58 communicating with slots 60, 62 of the cover plate and stem housing.

Pivoted on pin 56 to swing about an axis normal to the length of the stem is a catch 64 of inverted right-triangular configuration having a downwardly projecting point engaged loosely in an upwardly facing, downwardly tapering recess 65 of one of the jaws. A spring 66, held under compression between the catch and catch housing, biases the catch at one side of the upper end thereof into groove 48 for engagement under the shoulder defined by the upper surface of the groove.

When the device is unhitched from the drawn vehicle, the catch or trigger 64 holds the stem up so that the head is wholly above the top surfaces of the jaws. This permits the jaws to be spread at their rear ends by the entering connecting pin without requirement on the part of the operator for holding the stem up by means of the cable. The operator thus has both hands free to operate his machinery.

As the jaws are spread at their rear ends, they are forced together at their front ends and this pivots catch 64 clockwise in Figure 2, disengaging the same from groove 48. The stem is now free to drop, but only drops at this stage a very slight distance, into engagement with the top faces of the jaws. This is enough, however, to move the groove downwardly where the catch will not engage in it as the hitching operation continues.

As soon as the connecting pin is fully within the opening defined by the recesses 30, spring 34 expands, spreads the front ends of the jaws, and allows the head of the stem to drop the rest of the way into recesses 36 to lock the jaws about the connecting pin.

The inclined side edge of the catch is now in contact with the upper end of head 46, and whenever the jaws are to be unlocked, preliminary to unhitching of the vehicles, one pulls upon the cable to elevate the stem. The head 46 exerts a cam action on the catch, bearing against the inclined side edge thereof, and this biases the catch clockwise in Figure 2 once again. When the stem is fully elevated, the catch engages once again in groove 48, holding the stem up ready for the next use of the device.

At 68 there is designated a screw threadable inwardly through wall 14 against the jaw 20 not engaged with the trigger or catch plate 64. A lock nut 70 threaded on the screw may be turned home against wall 14 to hold the screw in selected positions to which it is adjusted. The screw holds the jaw engaged thereby against any pivotal movement or, if desired, adjustably limits pivotal movement of its associated jaw, thus permitting the jaws to close about connecting pins of comparatively small diameter, since the maximum space that can result when the jaws are spread is considerably reduced.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. A hitch to be carried by one vehicle, for engaging a connecting pin carried by another vehicle, comprising: a housing mountable on the one vehicle; a pair of jaws pivoted in the housing and recessed to receive said connecting pin between them, said jaws being arranged to be spread laterally by said pin, said jaws being under spring restraint tending to resist spreading of the same by said pin; a locking stem mounted on the housing for up and down movement and arranged to drop between the jaws on entry of the connecting pin into the recesses of the jaws, thus to lock the jaws about said pin; and a catch pivotally supported on the housing, said stem having a shoulder and the catch being under spring bias tending to engage the same under said shoulder to hold the stem against downward movement, one of the jaws having an upwardly opening recess engaging the catch for swinging of the catch out of engagement with said shoulder on spreading of the jaws by the connecting pin, the catch being formed with spaced pointed portions one extending under the shoulder and the other into the catch-receiving recess of said one jaw.

2. A hitch to be carried by one vehicle, for engaging a connecting pin carried by another vehicle, comprising: a housing mountable on the one vehicle; a pair of jaws pivoted in the housing and recessed to receive said connecting pin between them, said jaws being arranged to be spread laterally by said pin, said jaws being under spring restraint tending to resist spreading of the same by said pin; a locking stem mounted on the housing for up and down movement and arranged to drop between the jaws on entry of the connecting pin into the recesses of the jaws, thus to lock the jaws about said pin; and a catch pivotally supported on the housing, said stem having a shoulder and the catch being under spring bias tending to engage the same under said shoulder to hold the stem against downward movement, one of the jaws having an upwardly opening recess engaging the catch for swinging of the catch out of engagement with said shoulder on spreading of the jaws by the connecting pin, the catch being formed with spaced pointed portions one extending under the shoulder and the other into the catch-receiving recess of said one jaw, said catch pivoting about an axis normal to the length of and spaced laterally from the stem, the first pointed portion projecting laterally under said shoulder and the other pointed portion projecting downwardly into the catch-receiving recess of said one jaw.

3. A hitch to be carried by one vehicle, for engaging a connecting pin carried by another vehicle, comprising: a housing mountable on the one vehicle; a pair of jaws pivoted in the housing and recessed to receive said connecting pin between them, said jaws being arranged to be spread laterally by said pin, said jaws being under spring restraint tending to resist spreading of the same by said pin; a locking stem mounted on the housing for up and down movement and arranged to drop between the jaws on entry of the connecting pin into the recesses of the jaws, thus to lock the jaws about said pin; and a catch pivotally supported on the housing, said stem having a shoulder and the catch being under spring bias tending to engage the same under said shoulder to hold the stem against downward movement, one of the jaws having an upwardly opening recess engaging the catch for swinging of the catch out of engagement with said shoulder on spreading of the jaws by the connecting pin, the catch being formed with spaced pointed portions one extending under the shoulder and the other into the catch-receiving recess of said one jaw, said catch pivoting about an axis normal to the length of and spaced laterally from the stem, the first pointed portion projecting laterally under said shoulder and the other pointed portion projecting downwardly into the catch-receiving recess of said one jaw, the catch having an edge inclined obliquely to the line of movement of the stem and disposed for camming engagement by the stem during elevation of the stem out of a jaw-locking position, thus to bias the catch out of the path of movement of the stem during elevation of the stem.

4. A hitch to be carried by one vehicle, for engaging a connecting pin carried by another vehicle, comprising: a housing mountable on the one vehicle; a pair of jaws pivoted in the housing and recessed to receive said connecting pin between them, said jaws being arranged to be spread laterally by said pin, said jaws being under spring restraint tending to resist spreading of the same by said pin; a locking stem mounted on the housing for up and down movement and arranged to drop between the jaws on entry of the connecting pin into the recesses of the jaws, thus to lock the jaws about said pin; a catch pivotally supported on the housing, said stem having a shoulder and the catch being under spring bias tending to engage the same under said shoulder to hold the stem against downward movement, one of the jaws having an upwardly opening recess engaging the catch for swinging of the catch out of engagement with said shoulder on spreading of the jaws by the connecting pin, the catch being formed with spaced pointed portions one extending under the shoulder and the other into the catch-receiving recess of said one jaw, said catch pivoting about an axis normal to the length of and spaced laterally from the stem, the first pointed portion projecting laterally under said shoulder and the other pointed portion projecting downwardly into the catch-receiving recess of said one jaw, the catch having an edge inclined obliquely to the line of movement of the stem and disposed for camming engagement by the stem during elevation of the stem out of a jaw-locking position, thus to bias the catch out of the path of movement of the stem during elevation of the stem; and means carried by the housing adjustable into engagement with the other jaw to selectively limit pivotal movement thereof.

References Cited in the file of this patent

UNITED STATES PATENTS

| 1,565,112 | Sommer | Dec. 8, 1925 |
| 2,441,285 | Pfieffer | May 11, 1948 |
| 2,478,736 | Balzer | Aug. 9, 1949 |
| 2,591,916 | Caughman | Apr. 8, 1952 |